United States Patent
Harnetiaux et al.

(10) Patent No.: US 10,980,164 B2
(45) Date of Patent: Apr. 20, 2021

(54) WEAR DETERMINATION FOR AGRICULTURAL IMPLEMENT

(71) Applicant: CNH Industrial America LLC, New Holland, PA (US)

(72) Inventors: Travis Lester Harnetiaux, Bourbonnais, IL (US); Chad Michael Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/453,837

(22) Filed: Jun. 26, 2019

(65) Prior Publication Data

US 2020/0404827 A1    Dec. 31, 2020

(51) Int. Cl.
*B60Q 1/00* (2006.01)
*A01B 49/06* (2006.01)
*G01N 3/56* (2006.01)
*A01C 5/06* (2006.01)

(52) U.S. Cl.
CPC .............. *A01B 49/06* (2013.01); *G01N 3/56* (2013.01); *A01C 5/064* (2013.01)

(58) Field of Classification Search
CPC ........... A01B 49/06; G01N 3/56; A01C 5/064
USPC .................................................... 340/425.5
See application file for complete search history.

(56) References Cited

U.S. PATENT DOCUMENTS

| | | | |
|---|---|---|---|
| 4,742,326 A | 5/1988 | Gregoire et al. | |
| 4,850,454 A | 7/1989 | Korody | |
| 4,982,767 A | 1/1991 | Pezzoli et al. | |
| 6,318,279 B1* | 11/2001 | Rowlett | A01C 5/062 111/154 |
| 6,338,397 B1 | 1/2002 | Gezgin et al. | |
| 6,838,157 B2 | 1/2005 | Subramanian | |
| 7,669,398 B1* | 3/2010 | King | A01D 46/20 182/2.11 |
| 9,429,264 B2 | 8/2016 | Berger et al. | |
| 9,670,649 B2 | 6/2017 | Bewley et al. | |
| 9,689,771 B2 | 6/2017 | Allison et al. | |
| 9,699,947 B2 | 7/2017 | Wendte et al. | |

(Continued)

FOREIGN PATENT DOCUMENTS

WO    2017017289    2/2017

*Primary Examiner* — Kerri L McNally
*Assistant Examiner* — Thang D Tran
(74) *Attorney, Agent, or Firm* — Rebecca L. Henkel; Rickard K. DeMille

(57) ABSTRACT

An agricultural implement includes an electrically conducive ground engagement tool with an opening and a sensor having a first and second conductor. An insulative material extends around a periphery of the opening to a contact area, and a conductive material fills the opening and extends to the contact area to electrically couple the conductive material to the ground engagement tool. The first conductor electrically couples to the conductive material, and the second conductor electrically couples to the ground engagement tool. A controller may receive a signal from the sensor indicative of an electrical resistance between the first and second conductors, determine the ground engagement tool has worn past a threshold amount in response to receiving the sensor signal indicative of the electrical resistance being above a threshold value, and output an output signal in response to determining the ground engagement tool has worn past the threshold amount.

18 Claims, 6 Drawing Sheets

(56) References Cited

U.S. PATENT DOCUMENTS

| | | |
|---|---|---|
| 9,763,379 B2 | 9/2017 | Anderson et al. |
| 9,784,647 B2 | 10/2017 | Sidles |
| 10,011,975 B2 | 7/2018 | Carpenter et al. |
| 10,024,034 B2 | 7/2018 | Nicoson et al. |
| 2004/0202886 A1* | 10/2004 | Subramanian .......... F23R 3/007 428/632 |
| 2006/0048954 A1* | 3/2006 | Henry .................. E02F 9/2875 172/753 |
| 2006/0243839 A9* | 11/2006 | Barscevicius ............ D21D 1/30 241/261.2 |
| 2009/0007828 A1* | 1/2009 | Johnson ................. A01C 7/042 111/79 |
| 2011/0005784 A1* | 1/2011 | Landoll .................. A01C 7/205 172/500 |
| 2011/0011317 A1* | 1/2011 | Gengler ................. A01C 7/205 111/164 |
| 2011/0162241 A1* | 7/2011 | Wangsness ............ E01H 5/066 37/266 |
| 2011/0168068 A1* | 7/2011 | Senchuk ................ A01C 5/062 111/152 |
| 2011/0231069 A1* | 9/2011 | Ryder .................... A01C 7/203 701/50 |
| 2013/0248214 A1* | 9/2013 | Adams ................... A01C 7/203 172/140 |
| 2014/0083582 A1 | 3/2014 | Hsu et al. |
| 2014/0238283 A1* | 8/2014 | Wendte .................. A01B 49/06 111/164 |
| 2014/0261115 A1* | 9/2014 | Kowalchuk ............ A01B 49/06 111/120 |
| 2014/0311762 A1* | 10/2014 | Behmlander .......... E02F 3/8152 172/430 |
| 2015/0149049 A1* | 5/2015 | Bewley .................. G07C 5/006 701/50 |
| 2016/0178483 A1* | 6/2016 | Sidles ...................... E02F 9/26 73/146 |
| 2016/0227700 A1* | 8/2016 | Wendte .................... A01C 7/20 |
| 2016/0237657 A1* | 8/2016 | Carpenter ............. E02F 9/2841 |
| 2017/0049044 A1* | 2/2017 | Stoller ................. A01C 23/025 |
| 2017/0138019 A1* | 5/2017 | Nicoson ................. E02F 9/285 |
| 2017/0215334 A1* | 8/2017 | Dienst .................... A01C 5/064 |
| 2017/0356166 A1* | 12/2017 | Serrurier ............... E02F 9/2833 |
| 2018/0049365 A1* | 2/2018 | Anderson ................ A01C 7/06 |
| 2018/0052131 A1 | 2/2018 | Leuenberger et al. |
| 2018/0092293 A1* | 4/2018 | Rhodes .................. A01C 5/064 |
| 2018/0114305 A1* | 4/2018 | Strnad .................... G01N 33/24 |
| 2019/0000011 A1* | 1/2019 | Gervais .................. A01C 7/081 |
| 2019/0320575 A1* | 10/2019 | Kowalchuk ............ A01C 7/06 |

* cited by examiner

WEAR DETERMINATION FOR AGRICULTURAL IMPLEMENT

BACKGROUND

The disclosure relates generally to determining wear of a ground engagement component of an agricultural implement.

This section is intended to introduce the reader to various aspects of art that may be related to various aspects of the present disclosure, and are described below. This discussion is believed to be helpful in providing the reader with background information to facilitate a better understanding of the various aspects of the present disclosure. Accordingly, it should be understood that these statements are to be read in this light, and not as admissions of prior art.

Planting implements are used to deposit seeds and/or other agricultural product within an agricultural field. A planting implement may include multiple row units distributed across a width of the implement. Each row unit may be configured to deposit seeds at a desired depth beneath the soil surface of the field, thereby establishing rows of planted seeds. For example, each row unit may include opening discs that creates an initial cut onto the soil. The row unit may further include a ground engagement tool (e.g., forming point) that forms a seeding path (e.g., trench) within the soil by shaping the initial cut, in which the seeding path is used for seed deposition into the soil. It may be difficult to monitor or determine a structural condition of the ground engagement tool, such as a wear of the ground engagement tool. As an example, conventional approaches, such as manually inspecting the ground engagement tool, may take time because of the positioning of the ground engagement tool.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an agricultural implement includes a ground engagement tool configured to engage soil during operation of the agricultural implement, in which the ground engagement tool is electrically conductive and has an opening. The ground engagement tool also includes an insulative material extending circumferentially around a periphery of the opening and longitudinally from a first end of the opening to a contact area, a conductive material filling at least a portion of the opening and extending to the contact area, such that the conductive material is electrically coupled to the ground engagement tool at the contact area, and a sensor having a first conductor and a second conductor, in which the first conductor is electrically coupled to the conductive material, and the second conductor is electrically coupled to the ground engagement tool. The ground engagement tool further includes a controller having a memory and a processor, in which the controller is communicatively coupled to the sensor and configured to receive a sensor signal from the sensor indicative of an electrical resistance between the first conductor and the second conductor, in which the electrical resistance is at least partially based on a surface area of contact between the conductive material and the ground engagement tool at the contact area, determine the ground engagement tool has worn past a threshold amount in response to receiving the sensor signal indicative of the electrical resistance between the first conductor and the second conductor being above a threshold value, and output an output signal in response to determining the ground engagement tool has worn past the threshold amount.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
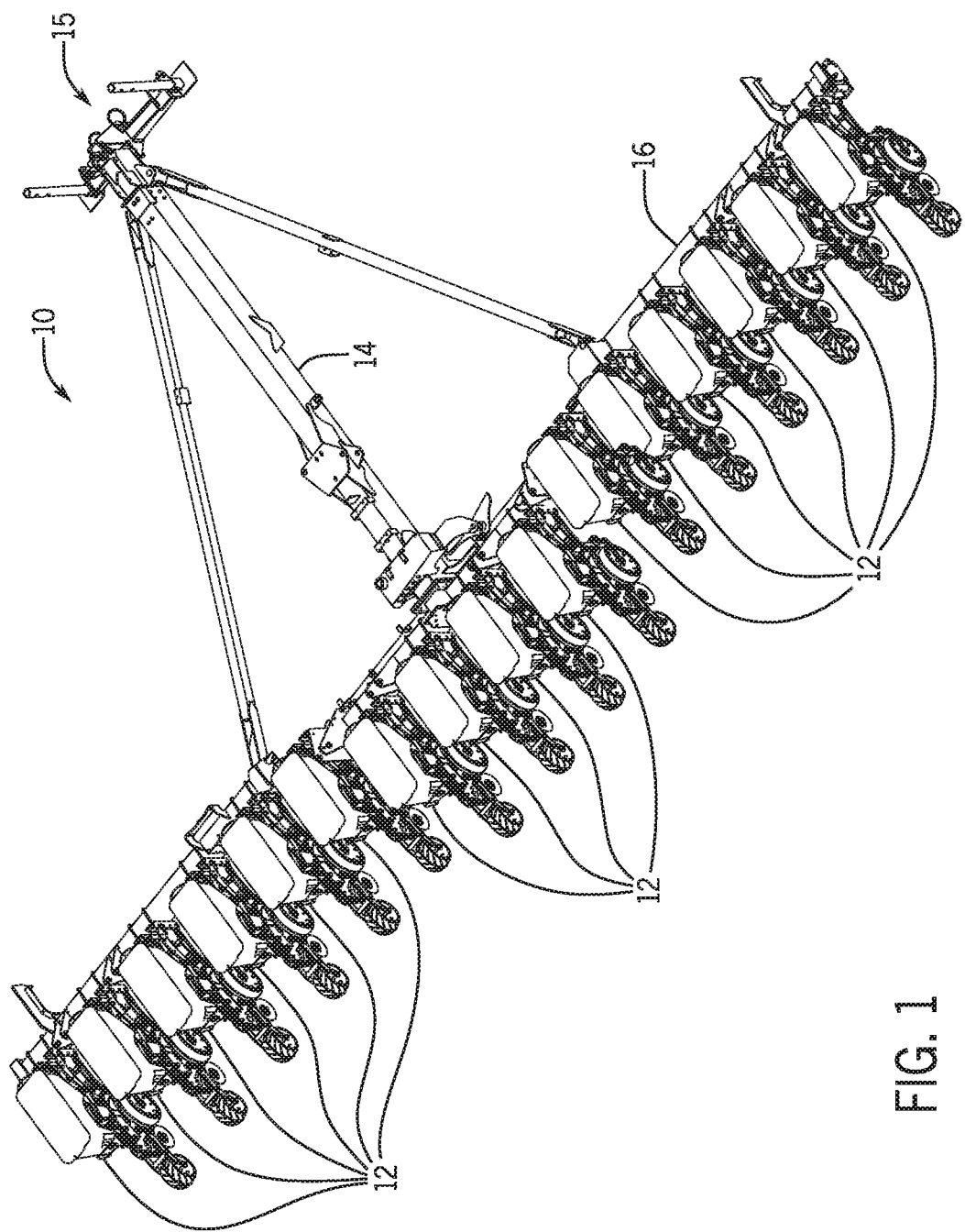
FIG. 1 is a perspective view of an embodiment of an agricultural implement having multiple row units distributed across a width of the agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural implement of an agricultural system. The agricultural implement may be configured to engage soil of a field during operation of the agricultural system. In some embodiments, the agricultural implement is a planting implement used to deposit seeds and/or agricultural products (e.g., fertilizer) into the soil. The planting implement may include opening discs that form an initial opening in the soil. The planting implement may also include a ground engagement tool (e.g., a forming point) that shapes the initial opening to form a seeding path for deposition of seeds. Additionally, the planting implement may include closing discs that move displaced soil back into the seeding path and/or a packer wheel that packs the soil on top of the seeds deposited within the seeding path.

Continued engagement of the ground engagement tool with the soil may cause the ground engagement tool to undergo a structural change, such as wear. In some cases, the structural change in the ground engagement tool may affect a performance of the planting implement. For example, excessive structural change in the ground engagement tool may reduce a size of the seeding path formed by the ground engagement tool. Thus, it may be desired to monitor the structural change in the ground engagement tool and replace the ground engagement tool when the change exceeds a threshold amount, thereby maintaining the performance of the planting implement. However, visual inspection of the structural change in each ground engagement tool of the planting implement may be difficult and time-consuming due to a position of each ground engagement tool. For instance, physical access and/or visual observation of each ground engagement tool may be limited because of the position of the ground engagement tool relative to other components of the planting implement.

Thus, the system disclosed herein automatically monitors a structural condition of at least one ground engagement tool to facilitate determining whether the ground engagement tool has undergone structural changes that exceed a threshold amount. In the embodiments disclosed herein, the planting implement may include a sensor configured to facilitate determining a structural change in a respective ground engagement tool. The sensor may be communicatively coupled to a controller and may output a signal to the controller to indicate a structural change in the ground engagement tool. Based on the signal, the controller may determine whether the ground engagement tool has undergone a structural change that exceeds a threshold amount, and may transmit a signal in response to determining the ground engagement tool has undergone a structural change that exceeds the threshold amount. Based on the signal output by the controller, operation of the agricultural implement may be adjusted to reduce or eliminate further structural changes in the ground engagement tool. Although this disclosure primarily discusses determining the structural change in any ground engagement tool for a planting implement, the techniques discussed in this disclosure may be applied to any ground engagement tool, such as of various suitable agricultural implements (e.g., a fertilizing implement, a cultivating implement, a tilling implement). Furthermore, in addition to or as an alternative to soil, the ground engagement tool may engage any other farming material, such as crops, manure, mulch, compost, another suitable material, or any combination thereof.

FIG. 1 is a perspective view of an embodiment of an agricultural implement 10 (e.g., planting implement) having multiple row units 12 distributed across a width of the agricultural implement 10. Each row unit 12 may be configured to perform a farming operation, such as depositing seeds and/or other agricultural products into soil of a field through which the agricultural implement 10 is driven. As illustrated, the agricultural implement 10 includes a tongue assembly 14, which includes a hitch 15 configured to couple the agricultural implement 10 to an appropriate tractor hitch (e.g., via a ball, clevis, or other coupling). The hitches may enable the agricultural implement 10 to be coupled to a work vehicle, such as a tractor. The work vehicle may drive through the field, thereby towing the agricultural implement 10 through the field to perform the farming operation on the field. The tongue assembly 14 is coupled to a tool bar 16 that supports multiple row units 12, thereby enabling the row units 12 to be driven through the field by the work vehicle. In certain embodiments, the work vehicle may be manually driven by an operator to tow the agricultural implement 10. In additional or alternative embodiments, the work vehicle may be a self-propelled vehicle configured to be automatically driven through the field to tow the agricultural implement.

Figure 2:
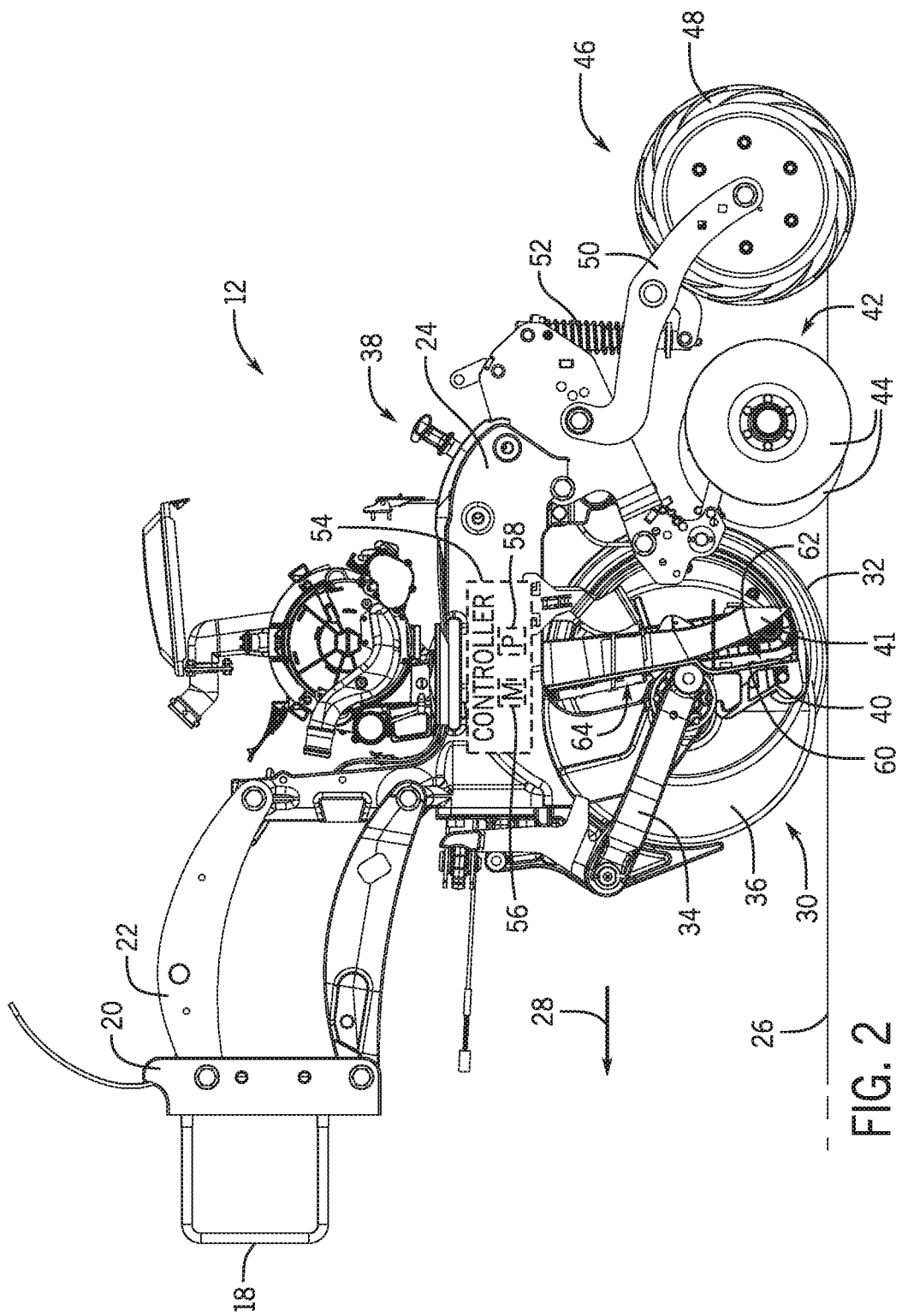
FIG. 2 is a side view of an embodiment of a row unit that may be employed on the agricultural implement of FIG. 1, in accordance with an aspect of the present disclosure.

FIG. 2 is a side view of an embodiment of a row unit 12 that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to drive the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 is configured to deposit seeds at a desired depth beneath the soil surface 26 as the row unit 12 traverses the field along a direction of travel 28. The row unit 12 includes an opener assembly 30 that engages the soil to form a seeding path in the soil for seed deposition into the soil. In the illustrated embodiment, the opener assembly 30 includes gauge wheels 32. For purposes of visualization and discussion, only one of the gauge wheels 32 is shown in the illustrated embodiment. The opener assembly 30 also includes arms 34 that pivotally couple the gauge wheels 32 to the frame 24, and opener discs 36 configured to create an initial opening in the soil. The gauge wheels 32 are configured to control a penetration depth of the opener discs 36 into the soil. In the illustrated embodiment, the row unit 12 includes a depth control system 38 configured to control the vertical position of the gauge wheels 32 (e.g., by maintaining the position of the arms 34), thereby controlling the penetration depth of the opener discs 36 into the soil.

The agricultural implement 10 additionally includes a ground engagement tool 40 (e.g., a forming point) that is positioned between the gauge wheels 32. The ground engagement tool 40 shapes the initial opening created by the opener discs 36. For example, after the opener discs 36 have created the initial opening and loosened the soil, the ground engagement tool 40 may engage the soil to form a seeding path from the initial opening. The depth control system 38 may control the vertical position of the ground engagement tool 40 to control the shape and depth of the seeding path formed by the ground engagement tool 40. After the ground engagement tool 40 forms the seeding path, the row unit 12 may then deposit seeds within the seeding path formed by the ground engagement tool 40. In the illustrated embodiment, the row unit 12 includes an agricultural product conveying system 41 configured to direct the seeds to the seeding path via gravitational force.

The opener assembly 30, which may include the ground engagement tool 40, is followed by a closing assembly 42 configured to move displaced soil back into the seeding path to cover the seed deposited within the seeding path. In the illustrated embodiment, the closing assembly 42 includes two closing discs 44. However, in alternative embodiments, the closing assembly may include other closing devices (e.g., a single closing disc, etc.). In addition, in certain embodiments, the closing assembly may be omitted. In the illustrated embodiment, the closing assembly 42 is followed by a packing assembly 46 configured to pack soil on top of the deposited seeds. The packing assembly 46 includes a packer wheel 48, a packer arm 50 that pivotally couples the packer wheel 48 to the frame 24, and a biasing member 52 configured to drive the packer wheel 48 toward the soil surface 26, thereby enabling the packer wheel 48 to pack soil on top of the deposited seeds. While the illustrated biasing member 52 includes a spring, in alternative embodiments, the biasing member may include another suitable biasing device, such as a hydraulic cylinder or a pneumatic cylinder. Furthermore, alternate embodiments of the agricultural implement may include any suitable number of components, such as no packer wheel, one opener disc, and so forth.

The ground engagement tool 40 may be subject to structural changes due to constant engagement with the soil. Although this disclosure primarily discusses structural change as wear, the structural change may include chipping, fragmenting, and/or any other occurrence that removes material from the ground engagement tool. Structural change in the ground engagement tool 40 may affect a performance of the agricultural implement, such as reducing a size of the seeding path formed by the ground engagement tool 40. Thus, monitoring the structural change in the ground engagement tool 40 may facilitate determining whether the structural change exceeds a threshold. Adjustments may be made to the agricultural implement in response to determining the structural change exceeds the threshold to maintain a performance of the agricultural implement. For example, an operation of the agricultural implement may be changed and/or the ground engagement tool 40 may be replaced. However, because ground engagement tool 40 is positioned between the gauge wheels 32 and the opener discs 36, it may be difficult to observe the state of the ground engagement tool 40 directly (e.g., visually identify any structural changes in the ground engagement tool 40).

As such, the agricultural implement 10 may include a sensor configured to output a sensor signal indicative of a structural change in the ground engagement tool 40. In some embodiments, the sensor may be communicatively coupled to a controller 54 of the agricultural implement 12. The controller 54 may be disposed on the agricultural implement, such as enclosed within the frame 24 of the row unit 12, and may be shielded and protected from external debris.

In additional or alternative embodiments, the controller may not be coupled to the agricultural implement, and may be remotely communicatively coupled to the sensor. The controller 54 has a memory 56 and a processor 58 configured to execute software code or instructions stored on a memory 56. The term "code" or "software code" used herein refers to any instructions or set of instructions that influence the operation of the controller 54. The code or software code may exist in a computer-executable form, such as machine code, which is the set of instructions and data directly executed by the controller 54, a human-understandable form, such as source code, which may be compiled in order to be executed by the controller 54, or an intermediate form, such as object code, which is produced by a compiler. As used herein, the term "code" or "software code" also includes any human-understandable computer instructions or set of instructions, e.g., a script, that may be executed on the fly with the aid of an interpreter executed by the controller 54.

As an example, the memory 56 may store processor-executable software code or instructions (e.g., firmware or software), which are tangibly stored on a tangible computer readable medium. Additionally or alternatively, the memory may store data (e.g., threshold to which the structural change is compared). As an example, the memory 56 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) or complex instruction set (CISC) processors.

In some embodiments, the controller 54 may be configured to output a signal in response to receiving feedback from the sensor. As an example, the signal may be configured to adjust an operation of the row unit 12, such as to reduce engagement penetration depth of the ground engagement tool 40 to reduce or eliminate further structural changes in the ground engagement tool 40. As another example, the signal may be configured to cause a notification to be presented (e.g., via a user interface). The notification may provide an operator of the agricultural implement with certain information associated with the structural change in the ground engagement tool 40. For instance, the information may include data regarding a rate of structural change in the ground engagement tool 40, a total amount of structural change in the ground engagement tool 40, a predicted amount of structural change in the ground engagement tool 40, and the like. The operator may use the information to determine whether to replace the ground engagement tool 40 and/or whether to adjust the operation of the agricultural implement.

The controller 54 is communicatively coupled to the sensor disposed in the ground engagement tool 40 via electrical connection(s) 60 (e.g., wire[s], cable[s]). In the illustrated embodiment, the electrical connection(s) 60 may be routed along a first side 62 (e.g., rear side) of the ground engagement tool 40 and then along a second side 64 (e.g., front side) of the agricultural product conveying system 41 to the controller 54 disposed within the frame 24. In certain embodiments, the electrical connection(s) 60 may generally be enclosed by the ground engagement tool 40 and/or the agricultural product conveying system 41, such that the electrical connections 60 is shielded from external debris.

Figure 3:
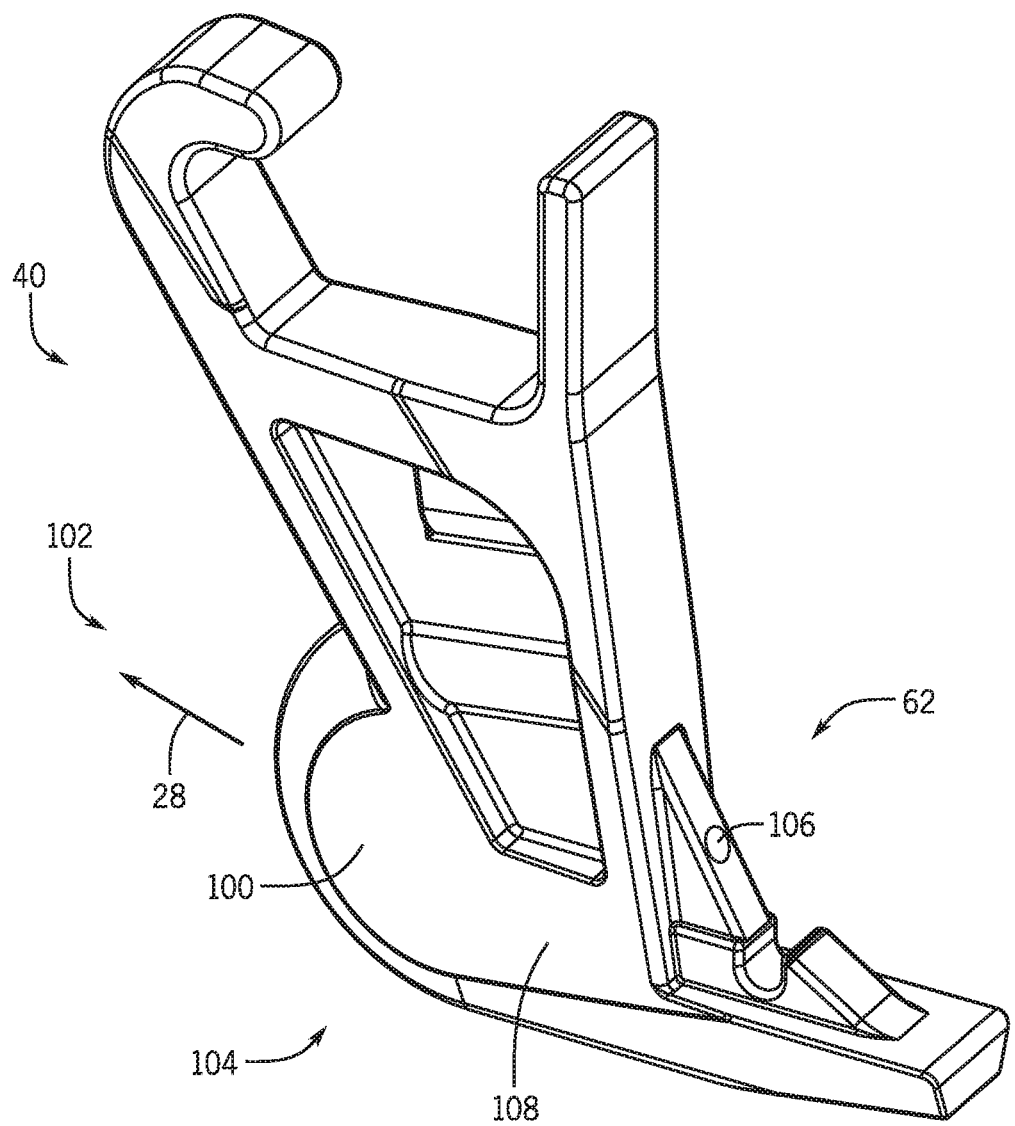
FIG. 3 is a perspective view of an embodiment of a ground engagement tool that may be employed on the row unit of FIG. 2, in accordance with an aspect of the present disclosure.

FIG. 3 is a perspective view of an embodiment of the ground engagement tool 40 that may be employed by the row unit 12 of FIG. 2. In the illustrated embodiment, the ground engagement tool 40 includes a ground engagement portion 100 disposed on a third side 102 (e.g., front side) of the ground engagement tool 40. In the illustrated embodiment, the ground engagement portion 100 has a curved shape, but in additional or alternative embodiments, the ground engagement portion may have any suitable shape, such as a pointed shape or a flat shape. The ground engagement portion 100 is configured to engage the soil during operation of the agricultural system. For instance, as the row unit traverses the field along the direction of travel, the ground engagement portion 100, which is disposed within the soil shapes the opening formed by the opener discs to establish the seeding path. Due to prolonged engagement with the soil, the ground engagement portion 100 may undergo a structural change, such as wear at the third side 102 and/or at a fourth side 104 (e.g., bottom side) of the ground engagement tool 40. The structural change may reduce the effectiveness of the ground engagement tool 40 in forming the seeding path. For example, the ground engagement portion 100 may reduce in size, thereby alternating the shape and/or dimensions of the seeding path formed by the ground engagement tool 40.

The ground engagement tool 40 has an opening 106 formed through a body 108 of the ground engagement tool 40 at the first side 62 of the ground engagement tool 40. By way of example, the opening 106 may be formed via drilling, punching, boring, puncturing, another suitable technique, or any combination thereof. The sensor configured to output a signal indicative of structural changes in the ground engagement tool 40 may be inserted through the opening 106 to be positioned within the ground engagement tool 40. The electrical connection(s) may be routed through the opening 106 and along the first side 62 of the ground engagement tool 40 to couple the sensor disposed in the opening 106 to the controller. Although the illustrated opening 106 has a substantially circular cross-sectional shape, the opening may have any suitable cross-sectional geometric shape to accommodate the sensor.

Figure 4:
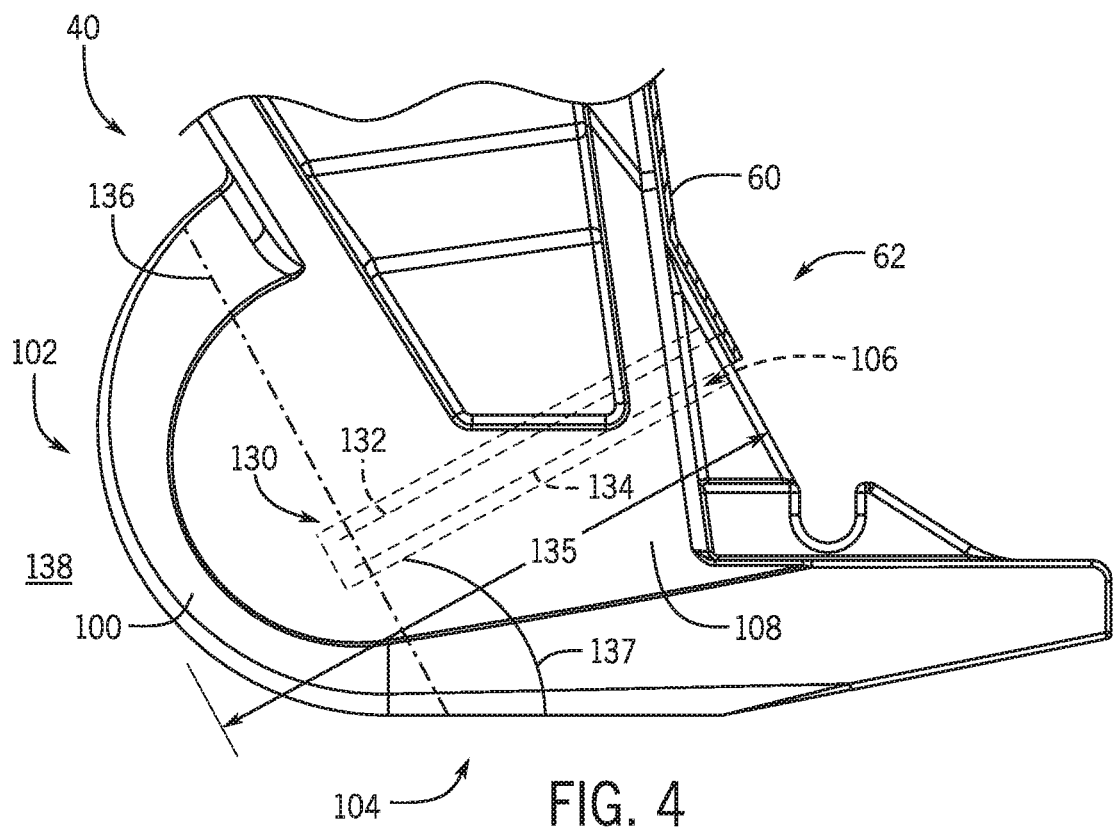
FIG. 4 is a side view of the ground engagement tool having an embodiment of a sensor configured to facilitate determining a structural change in the ground engagement tool, in accordance with an aspect of the present disclosure.

FIG. 4 is a side view of the ground engagement tool 40 having an embodiment of a sensor 130 configured to facilitate determining a structural change in the ground engagement tool 40. In the illustrated embodiment, the sensor 130 includes a first conductor 132 (e.g., a first wire) and a second conductor 134 (e.g., a second wire) that are each positioned within the opening 106. As shown in FIG. 4, the opening 106 extends through the body 108 from the first side 62 of the ground engagement tool 40 toward the third side 102 of the ground engagement tool 40, and terminates at the ground engagement portion 100 of the ground engagement tool 40 to facilitate determining the structural change in the ground engagement portion 100. The opening 106 may extend at least a part of a distance 135 spanning between the first side 62 and the third side 102. As an example, the opening 106 may extend through 50% to 70% of the distance 135, 70% to 90% of the distance 135, or more than 90% of the distance 135. Furthermore, the opening 106 may be oriented at an angle 137 with respect to the fourth side 104. By way of example, the angle 137 may be approximately parallel with the fourth side 104, between 0 degrees and 45 degrees with respect to the fourth side 104, or between 45 degrees and 90 degrees with respect to the fourth side 104. Moreover, although the illustrated opening 106 is substantially straight, additional or alternative embodiments of the opening 106 may be curved or bent, such as turning toward the fourth side 104, turning away from the fourth side 104, and so forth.

The electrical connections 60 may be electrically coupled to the first conductor 132 and/or the second conductor 134 to enable the sensor 130 to output a signal to the controller indicative of an operating parameter (e.g., electrical resistance between the conductors 132, 134, a current flow through the conductors 132, 134, and/or a voltage associated with the current flowing through of the conductors 132, 134). Based on the signal from the sensor 130, the controller may determine the structural condition of the ground engagement tool 40. In some embodiments, the first conductor 132 or the second conductor 134 may be provided with a current flow (e.g., via an applied voltage) and the current flow may then be received by the other of the first or second conductor 132, 134. For instance, a power source (e.g., of the sensor 130) may supply the current flow and a receiver (e.g., of the sensor 130) may be configured to detect a received current flow. The sensor 130 may then send a sensor signal to the controller based on the reading of the receiver, and the controller may detect the current flow, a voltage associated with the current flow, and/or an electrical resistance associated with the current flow based on the sensor signal. Additionally or alternatively, the controller may output the current flow to the sensor 130 and the controller is configured to acquire the received current flow from the sensor 130. As such, the controller may directly detect the received current flow (e.g., there is substantially no electrical resistance in the sensor 130). In the illustrated original state of the ground engagement tool 40, the first conductor 132 and the second conductor 134 are not electrically coupled to one another and, therefore, the current may not flow between the first conductor 132 and the second conductor 134. Accordingly, the controller receives feedback (e.g., the controller receives a zero magnitude signal) indicating that no current is flowing between the conductors 132, 134 (e.g., there is a large electrical resistance in the sensor 130 blocking current flow between the conductors 132, 134). Thus, in the embodiment illustrated in FIG. 4, the controller may determine that the ground engagement tool 40 is not worn past a wear line 136 or a threshold amount that the sensor 130 extends beyond, in response to determining that there is no current flow between the first conductor 132 and the second conductor 134. The ground engagement tool 40 may effectively form the seeding path in the soil while the ground engagement tool 40 has not worn past the wear line 136.

In a worn state of the ground engagement tool 40, in which the ground engagement tool 40 has worn past the wear line 136, the sensor may output a signal indicative of current flow and/or of an electrical resistance between the first conductor 132 and the second conductor 134. As used herein, the worn state of the ground engagement tool 40 refers to a structural condition in which at least a portion of the ground engagement tool 40 has worn past the wear line 136. For instance, the ground engagement tool 40 may be worn past the wear line 136 from the third side 102 and/or the fourth side 104. Wearing the ground engagement tool 40 past the wear line 136 may expose the first conductor 132 and/or the second conductor 134 to an ambient environment 138. By way of example, the ambient environment 138 may be the soil in which the ground engagement tool 40 is disposed during operation of the agricultural implement. In some cases, the ambient environment 138 (e.g., the soil) may include moisture, such as precipitation, soil water, and the like. As such, the conductors 132, 134 may contact the moist environment (e.g., soil), which may be electrically conductive, thereby electrically coupling the conductors 132, 134 to one another. Thus, current may flow between the first conductor 132 and the second conductor 134. The current flow may be detected by the sensor 130 via the electrical connections 60, and the sensor 130 may output the signal that indicates there is current flow to the controller. As such, the controller may determine that the ground engagement tool 40 has worn past the wear line 136 in response to determining that there is current flowing between the first conductor 132 and the second conductor 134. In certain embodiments, a non-conductive material may separate the first and second conductors 132, 134 to block the conductors 132, 134 from electrically coupling to one another while the ground engagement tool 40 has not worn past the wear line 136.

The controller may additionally determine an amount of structural change in the ground engagement tool 40 based on the operating parameter (e.g., current, voltage, electrical resistance) detected by the controller. For instance, a greater amount of structural change (e.g., wear) in the ground engagement tool 40 may expose a greater amount of the first conductor 132 and/or the second conductor 134 to the ambient environment 138 (e.g., soil). As such, there may be an increased likelihood that the first conductor 132 and the second conductor 134 contact with moisture within the environment (e.g., soil), thereby enabling current to flow between the first conductor 132 and the second conductor 134. That is, increased structural change in the ground engagement tool 40 may increase the frequency of detection of current flow between the first conductor 132 and the second conductor 134. As such, the controller may monitor the frequency at which current flow between the first conductor 132 and the second conductor 134 is detected to determine the extent at which the ground engagement tool 40 is worn.

Additionally or alternatively, the controller may determine an amount of structural change in the ground engagement tool 40 based on a magnitude of an electrical resistance between the conductors 132, 134. For example, while the ground engagement tool 40 is in the worn state, a current having an associated voltage value is input to the first conductor 132. The current then flows through the ambient environment, which may act as a resistor that reduces the current flow between the conductors 132, 134, and the second conductor 134 receives the current. In alternative embodiments, the current is input through the second conductor 134 and is received by the first conductor 132. To this end, the conductors 132, 134, may each be made of a hard material, such as tungsten carbide and/or hardened steel, such that the conductors 132, 134 do not wear as quickly as the ground engagement tool 40 during operation of the agricultural implement. If the structural change in the ground engagement tool 40 is small (e.g., the conductors 132, 134 are less exposed to the ambient environment), the ambient environment may be in contact with a smaller amount of the conductors 132, 134, thereby providing a reduced electron flow between the conductors 132, 134. Thus, the ambient environment greatly reduces current flow between the conductors 132, 134. As a result, the current flow between the conductors 132, 134 is small (e.g., compared to the applied voltage), thereby indicating the magnitude of the electrical resistance between the conductors 132, 134 is large. However, if the structural change in the ground engagement tool 40 is greater (e.g., the conductors 132, 134 are exposed more to the ambient environment), the ambient environment may be in contact with more of the conductors 132, 134, thereby providing a greater electron flow between the conductors 132, 134. Thus, there may be a smaller reduction in current flow between the conductors 132, 134. In this manner, the current flow between the conductors 132, 134 is larger (e.g., compared to the applied voltage), thereby indicating the magnitude of the electrical resistance between the conductors 132, 134 is small. In other words, a greater magnitude of electrical resistance indicates lesser structural changes in the ground engagement tool 40, and a lesser magnitude of electrical resistance indicates greater structural change in the ground engagement tool 40.

In some embodiments, the controller may compare the magnitude of the electrical resistance, or the ratio of the applied voltage compared to the detected current flow, with a threshold electrical resistance value corresponding to the threshold amount of structural change in the ground engagement tool 40. The controller may determine that the structural change in the ground engagement tool 40 is greater than the threshold amount if the magnitude of the electrical resistance is greater than the threshold electrical resistance value. Additionally or alternatively, the controller may determine that the structural change in the ground engagement tool 40 is greater than the threshold amount if the change in electrical resistance (e.g., a percent increase in measured electrical resistance) is greater than a threshold change. Thus, the determination of the structural change via the measurement of the electrical resistance is not affected by the type of ambient environment, which may change the magnitude of the electrical resistance measurement, engaged by the ground engagement tool 40. In further embodiments, another parameter associated with the electrical resistance, such as a voltage value, may be determined in addition to or as an alternative to the electrical resistance measurement, and the parameter may be used to determine if the structural change in the ground engagement tool 40 is greater than the threshold amount.

Although conductors 132, 134 are disposed within the opening 106 in the illustrated embodiment, in alternative embodiments, only one of the conductors may be disposed within the opening, and the other of conductors may be electrically coupled to the ground engagement tool. For example, the first conductor may be disposed within the opening and may be surrounded by an insulative material (e.g., a rubber plug, insulating epoxy) that blocks an electrical connection between the first conductor and the ground engagement tool. The second conductor may be electrically coupled to (e.g., directly in contact with) the ground engagement tool, which may be made of a conductive material. In this way, when the ground engagement tool is not worn, the insulative material blocks current flow between the conductors. However, when the ground engagement tool has worn to an extent such that the insulative material is worn past a threshold amount, the first conductor may be exposed to the ambient environment. As such, current may flow between the conductors when moisture (e.g., in the soil) electrically couples the exposed first conductor to the ground engagement tool, thereby electrically coupling the first conductor to the second conductor.

Figure 5:
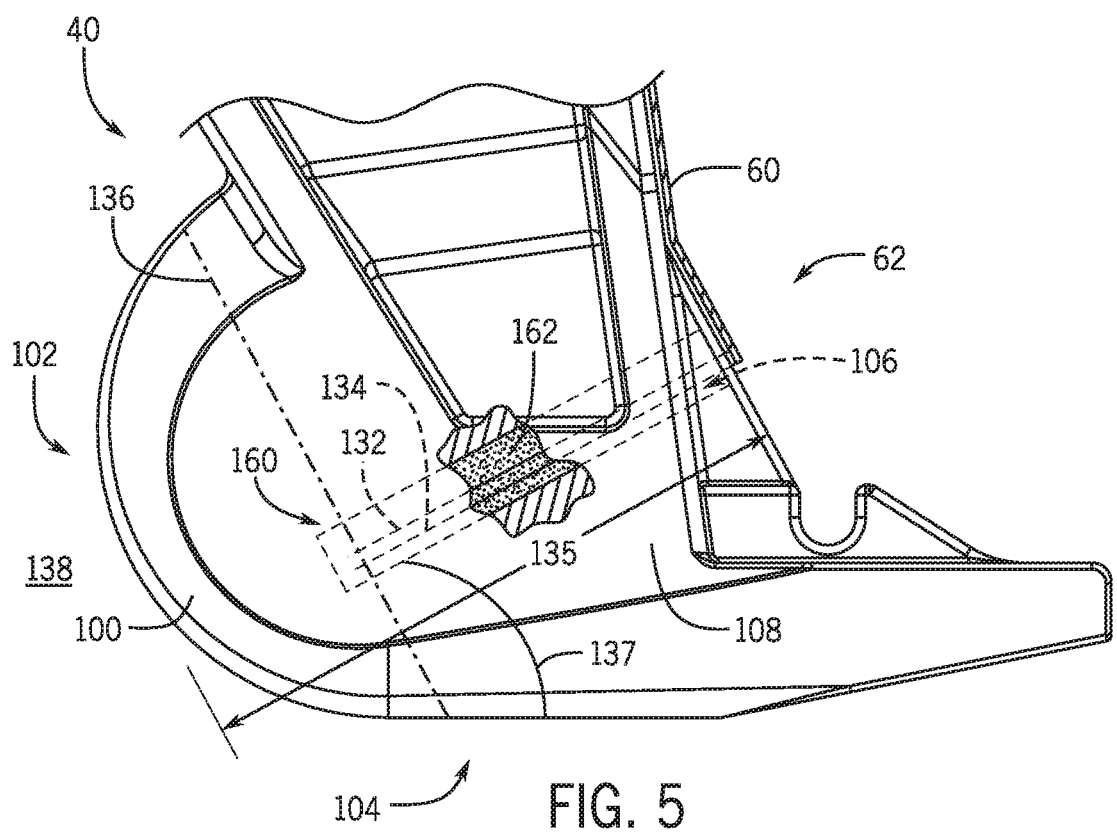
FIG. 5 is a side view of the ground engagement tool having an embodiment of a sensor configured to facilitate determining a structural change in the ground engagement tool, in accordance with an aspect of the present disclosure.

FIG. 5 is a side view of the ground engagement tool 40 having an embodiment of a sensor 160 configured to facilitate determining a structural change in the ground engagement tool 40. The sensor 160 includes the first conductor 132 and the second conductor 134 disposed in the opening 106 and that terminate in the ground engagement portion 100. The first conductor 132 and/or the second conductor 134 may be electrically coupled to the electrical connections 60 to enable the controller to receive a signal (e.g., indicative of current flow and/or electrical resistance between the conductors 132, 134) from the sensor 130. In the illustrated embodiment, the opening 106 is at least partially filled with an embedded material 162 that surrounds the first conductor 132 and the second conductor 134, such that the first conductor 132 is blocked from coming into contact with the second conductor 134. For example, at least a portion of the ground engagement tool 40 may be formed from the embedded material 162. The conductors 132, 134 may be disposed within a mold, and the embedded material may flow into the mold to form the ground engagement tool 40, such that the first conductor 132 and the second conductor 134 are embedded within the embedded material 162 as the ground engagement tool 40 forms. In another example, the first conductor 132 and the second conductor 134 may be inserted into the opening 106, and then the embedded material 162 may be injected into the opening 106 to embed the first conductor 132 and the second conductor 134. The embedded material 162 may include an insulative material, such as a rubber, thermoplastic elastomer, a plastic, a polymer, a gel, a foam, another suitable material, or any combination thereof, such that electricity is not conducted between the first conductor 132 and the second conductor 134. As such, while the ground engagement tool 40 has not worn past the wear line 136, the first conductor 132 is not electrically coupled to the second conductor 134. Thus, a voltage provided between the first conductor 132 and the second conductor 134 may not flow current between the first conductor 132 and the second conductor 134 while the ground engagement tool 40 is not worn past the wear line 136 (e.g., the electrical resistance between the conductors 132, 134 is large). As a result, the sensor 160 may output a zero magnitude signal to the controller indicating there is no current flow between the conductors 132, 134, and the controller may determine the ground engagement tool 40 has not worn past the wear line 136.

In the worn state of the ground engagement tool 40, in which at least a portion of the ground engagement tool 40 is worn past the wear line 136, the embedded material 162 disposed in the opening 106 may also be at least partially worn. Wearing of the embedded material 162 may enable the first conductor 132 and the second conductor 134 to come into contact with one another. For example, in the worn state, the first conductor 132 and/or the second conductor 134 may be exposed to the ambient environment 138, and the embedded material 162 may not be positioned between the first conductor 132 and the second conductor 134. Thus, movement of the first conductor 132 and the second conductor 134 toward one another is enabled. Further movement of the ground engagement tool 40, such as while the ground engagement tool 40 is disposed within the soil, may drive the first conductor 132 and the second conductor 134 toward one another, thereby causing the conductors 132, 134 to come into contact with one another to establish an electrical connection. Therefore, current may flow between the first conductor 132 and the second conductor 134 (e.g., the electrical resistance between the conductors 132, 134 is small). The sensor 160 may detect the current flow and output the signal that indicates the current flow to the controller. As such, in the embodiment illustrated in FIG. 5, if the controller determines that there is current flow between the first conductor 132 and the second conductor 134, the controller may determine that the ground engagement tool 40 has worn past the wear line 136.

In some embodiments, a greater amount of structural change in the ground engagement tool 40 may expose a greater amount of the first conductor 132 and/or the second conductor 134 to the ambient environment 138. For this reason, there may be an increased likelihood that the first conductor 132 and the second conductor 134 come into contact with one another, thereby increasing the frequency of detection of current flow between the first conductor 132 and the second conductor 134. Thus, the controller may determine the frequency at which current flow between the first conductor 132 and the second conductor 134 is detected to determine the extent that the ground engagement tool 40 is worn.

Figure 6:
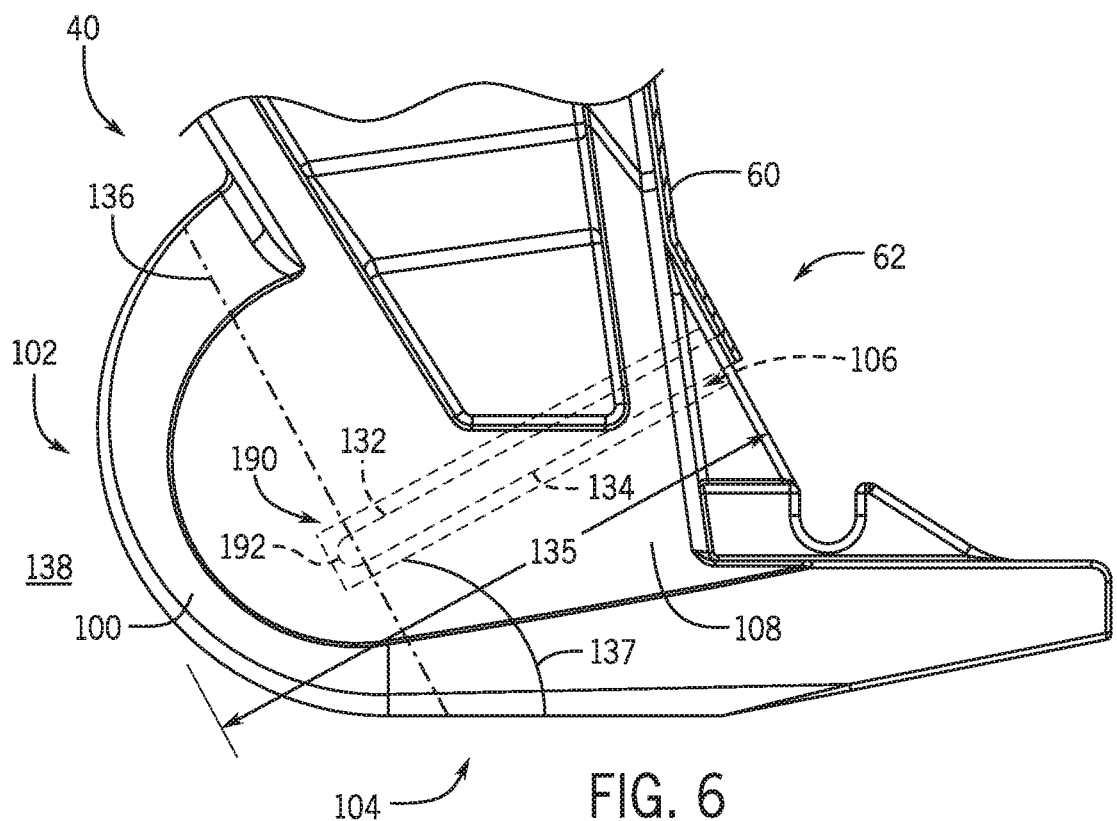
FIG. 6 is a side view of the ground engagement tool having an embodiment of a sensor configured to facilitate determining a structural change in the ground engagement tool, in accordance with an aspect of the present disclosure.

FIG. 6 is a side view of the ground engagement tool 40 having an embodiment of a sensor 190 configured to facilitate determining a structural change in the ground engagement tool 40. In the illustrated embodiment, the sensor 190 includes the first conductor 132 and the second conductor 134 disposed in the opening 106 and that terminate at the ground engagement portion 100. The first conductor 132 and the second conductor 134 may be electrically coupled to one another at a coupling portion 192, thereby forming a loop. Furthermore, the first conductor 132 and/or the second conductor 134 may be electrically coupled to the electrical connections 60 to enable the sensor to output a signal to the controller. For instance, a current may be provided to flow through the first conductor 132 and the second conductor 134. While the ground engagement tool 40 has not worn past the wear line 136, the first conductor 132 and the second conductor 134 may be electrically coupled to one another to enable current to flow between the first conductor 132 and the second conductor 134 (e.g., the electrical resistance between the conductors 132, 134 is small). Thus, the sensor 190 may detect a current flow between the first conductor 132 and the second conductor 134 and may output a signal indicating the current flow to the controller. As such, the controller may determine the ground engagement tool has not worn past the wear line 136 in response to determining there is current flow between the first conductor 132 and the second conductor 134.

While the ground engagement tool 40 is in the worn state, the coupling portion 192 may be exposed to the ambient environment 138. In some embodiments, the coupling portion 192 may have a weaker structural integrity relative to the first conductor 132 and/or the second conductor 134, such as having a smaller diameter or thickness and/or be manufactured from a weaker material as compared to the first conductor 132 and/or the second conductor 134. For example, the opening 106 may be embedded with insulation (e.g., the embedded material). As the ground engagement tool 40 moves through the soil while the coupling portion 192 is exposed to the soil, the insulation may wear away and the coupling portion 192 may break due to the force exerted by the soil onto the coupling portion 192. Breaking the coupling portion 192 may electrically decouple the first conductor 132 from the second conductor 134, such that current may no longer flow between the first conductor 132 and the second conductor 134, and the insulation in the opening 106 may block the first conductor 132 from contacting the second conductor 134 (e.g., the electrical resistance between the conductors 132, 134 is large). As a result, the sensor 190 does not detect a current flow and may output the zero magnitude signal to the controller. Thus, in the embodiment illustrated in FIG. 6, the controller may determine the ground engagement tool 40 has worn past the wear line 136 upon receiving the signal indicative that there is no current flow between the conductors 132, 134.

It should be noted that multiple sensors may be disposed within the ground engagement tool. By way of example, one or more sensors 130 of FIG. 4, one or more sensors 160 of FIG. 5, one or more sensors 190 of FIG. 6, or any combination thereof, may be disposed in one of the ground engagement tools. The sensors may be disposed at different locations within the ground engagement tool, and each sensor may be communicatively coupled to the controller. In some embodiments, the controller may be configured to determine a position of each sensor based on the feedback received from each respective sensor. For example, the location of each sensor about the ground engagement tool 40 may be stored in the memory of the controller to enable the controller to determine the structural change in various sections or the pattern of structural change in the ground engagement tool 40. Moreover, while one ground engagement tool 40 is discussed with reference to FIGS. 4-6, there may be one sensor in each tool or a portion of the tools of the agricultural implement.

Figure 7:
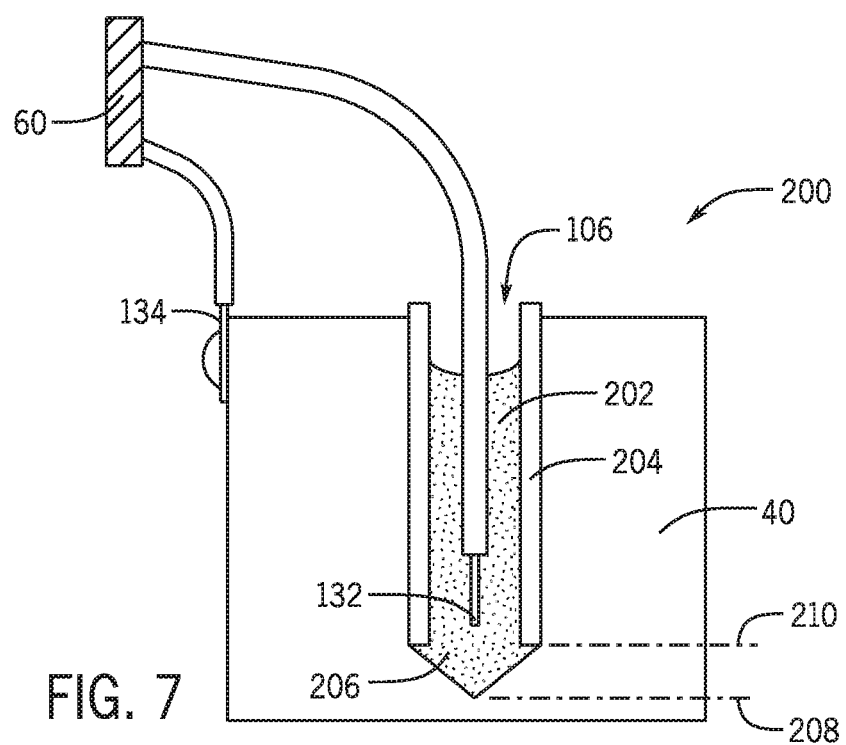
FIG. 7 is a section view of an embodiment of a sensor that may be employed in the ground engagement tool of FIGS. 2 and 3, in accordance with an aspect of the present disclosure.

FIG. 7 is a cross-sectional view of an embodiment of a sensor 200 that may be employed in the ground engagement tool 40 of FIGS. 2 and 3. The illustrated ground engagement tool 40 includes the opening 106, in which the first conductor 132 is disposed. The opening 106 may be at least partially filled with a conductive embedded material 202, such as a conductive polymer (e.g., conductive epoxy). Furthermore, the opening 106 may be lined with an insulative material 204 (e.g., plastic). The insulative material 204 may extend circumferentially around an entire periphery of the opening 106 and longitudinally up to a contact area 206. In this way, at the contact area 206, the conductive embedded material 202 contacts the ground engagement tool 40, which may be made of a conductive material (e.g., steel), to electrically couple the first conductor 134 to the ground engagement tool 40. Furthermore, the second conductor 134 may be electrically coupled to (e.g., directly in contact with) the ground engagement tool 40. As such, the first conductor 132 is electrically coupled to the second conductor 134 via the ground engagement tool 40 and the conductive embedded material 202 at the contact area 206 when the ground engagement tool 40 is not worn.

As the ground engagement tool 40 wears, part of the conductive embedded material 202 may also wear at the contact area 206. Wearing of the conductive embedded material 202 may affect the electrical connection between the conductors 132, 134. To this end, a geometry of the contact area 206 may be formed (e.g., including a conical shape) such that wearing of the conductive embedded material 202 at the contact area 206 changes the surface area of contact between the conductive embedded material 202 and the ground engagement tool 40. For instance, wearing of the conductive embedded material 202 reduces the surface area of contact between the conductive embedded material 202 and the ground engagement tool 40, thereby reducing the electron flow between the conductors 132, 134. As a result, electrical resistance between the conductors 132, 134 increases. As such, the amount of wear of the ground engagement tool 40 may be determined by determining the electrical resistance between the conductors 132, 134 using similar techniques described above (e.g., determining the current flow as compared to the applied voltage). The conductive embedded material 202 and/or the ground engagement tool 40 may be configured such that the electrical resistance (e.g., a first electrical resistance) between the conductors 132, 134 is known while the ground engagement tool 40 is not worn. At a first wear threshold 208, in which a portion of the conductive embedded material 202 is worn, the controller may determine a second electrical resistance between the conductors 132, 134, in which the second electrical resistance is greater than the first electrical resistance. Further wearing of the ground engagement tool 40 may cause further wearing of the conductive embedded material 202 at the contact area 206, thereby increasing the determined electrical resistance between the conductors 132, 134. At a second wear threshold 210, substantially all of the conductive embedded material 202 at the contact area 206 may be worn such that the conductive embedded material 202 is no longer in contact with the ground engagement tool 40. As a result, no electrical connection is present between the conductors 132, 134. Thus, the controller may determine a lack of current flow between the conductors 132, 134 when the ground engagement tool 40 has worn past the second wear threshold 210.

Figure 8:
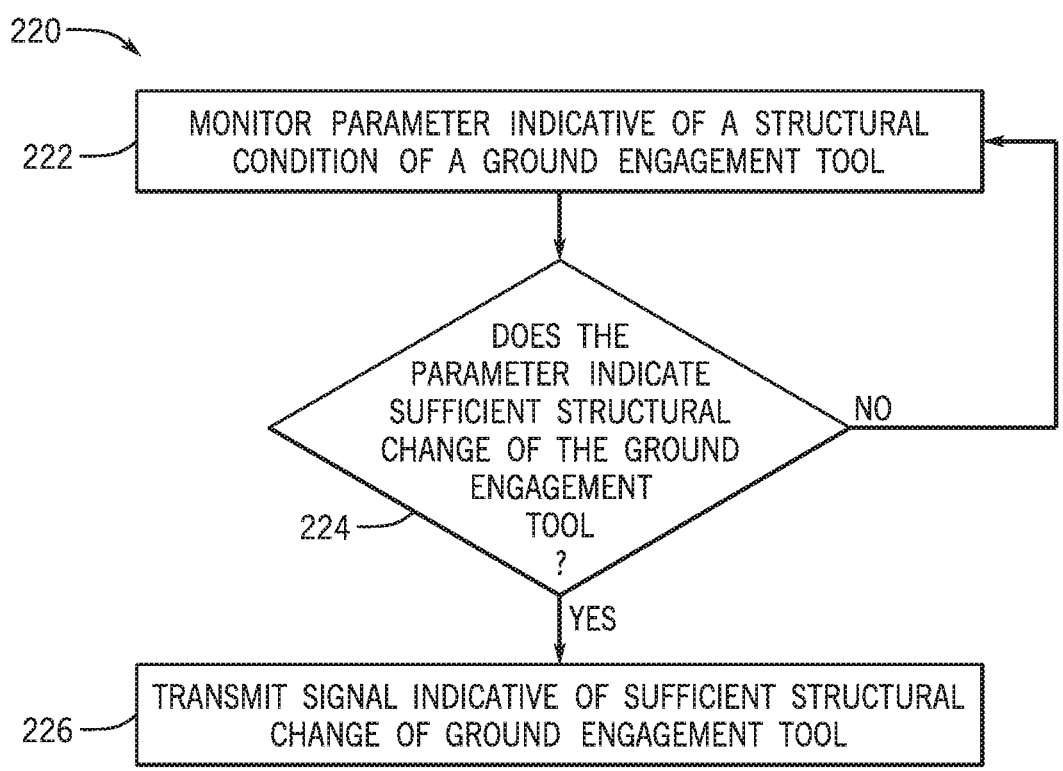
FIG. 8 is a flowchart of an embodiment of a method or process for determining a structural change in the ground engagement tool using a sensor, in accordance with an aspect of the present disclosure.

FIG. 8 is a flowchart of an embodiment of a method or process 220 for determining a structural change (e.g., wear) in the ground engagement tool using a sensor, such as any of the sensors described with respect to FIGS. 4-6. In some embodiments, the method 220 may be performed by a controller, such as the controller 54 of FIG. 2. It should be noted that a method that is different than the method 220 may be performed, such as for a different configuration of the agricultural implement. For instance, additional steps may be performed in addition to the steps depicted in FIG. 8, or certain step(s) depicted in FIG. 8 may be removed, modified, or performed in a different order.

At block 222, a sensor signal indicative of a structural condition of the ground engagement tool is received. For example, the sensor signal may be associated with a current flow between the first and second conductors. The sensor may be communicatively coupled to the controller to enable the sensor to provide the sensor signal to the controller indicative of the detection of current flow. Thus, the controller may determine a structural change in the ground engagement tool based on the received sensor signal.

At block 224, the controller determines whether the structural change (e.g., wear) exceeds a threshold structural change based on the sensor signal. If the sensor signal indicates that the structural change is less than the threshold structural change, no action may be taken. With reference to the sensor 130 of FIG. 4 and the sensor 160 of FIG. 5, the parameter is indicative that there is no sufficient structural change in the ground engagement tool when the sensor does not detect a current flow between the conductors of the sensor, because the conductors of the sensor are not electrically coupled to one another (e.g., the electrical resistance between the conductors is large). With reference to the sensor 190 of FIG. 6, the parameter is indicative that there is no sufficient structural change in the ground engagement tool when the sensor does detect a current flow between the conductors of the sensor, because the conductors are electrically coupled to one another (e.g., the electrical resistance between the conductors is small). As mentioned above, the controller may additionally or alternatively determine whether the structural change in the ground engagement tool exceeds the threshold structural change by using the sensor signal, such as a frequency of the detected current flow and/or a magnitude of electrical resistance associated with the current flow, to compare with a threshold value. For example, if the controller determines the frequency of the detected current flow does not exceed a threshold frequency, the controller may determine that the structural change in the ground engagement tool does not exceed the threshold structural change. Additionally or alternatively, if the controller determines the magnitude of the electrical resistance associated with the current flow is less than a threshold magnitude, the controller may determine that the structural change in the ground engagement tool does not exceed the threshold structural change.

However, if the sensor signal indicates that the structural change is greater than the structural change threshold, the controller may output an output signal indicative of the structural change in the ground engagement tool exceeding the threshold structural change, as shown at block 226. With reference to the sensor 130 of FIG. 4 and the sensor 160 of FIG. 5, the parameter is indicative that there is sufficient structural change in the ground engagement tool when the sensor does detect current flow between the conductors of the sensor (e.g., the electrical resistance between the conductors is small), because the structural change has caused the conductors of the sensor to electrically couple to one another. With reference to the sensor 190 of FIG. 6, the parameter is indicative that that there is sufficient structural change in the ground engagement tool when the sensor does not detect current flow between the conductors of the sensor (e.g., the electrical resistance between the conductors is large), because the conductors are no longer electrically coupled to one another. Additionally or alternatively, the controller may determine the frequency of the detected current flow exceeds the threshold frequency to determine that the structural change in the ground engagement tool exceeds the threshold structural change. Further, the controller may determine the magnitude of the electrical resistance associated with the current flow is greater than the threshold magnitude to determine that the structural change in the ground engagement tool exceeds the threshold structural change.

In some embodiments, the output signal may cause an adjustment to the operation of the agricultural implement. As an example, the controller may output the output signal to increase the penetration depth of the ground engagement tool within the soil to compensate for the worn forming point (e.g., to form the seeding path having a similar depth as an unworn forming point). As a further example, the controller may slow down the travel speed of the agricultural implement, or suspend operation of the agricultural implement.

In additional or alternative embodiments, the sensor signal includes a notification that the structural change in one of the ground engagement tools is greater than the structural change threshold. For instance, the controller may output the output signal to a user interface of the work vehicle attached to the agricultural implement having the ground engagement tool. The notification may be presented on a display of the user interface within a cab of the work vehicle to inform an operator of the work vehicle that the structural change in the ground engagement tool has exceeded the structural change threshold. The operator may then adjust an operation of the agricultural implement (e.g., to lower the position of the ground engagement tool within soil) and/or replace the ground engagement tool.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement, comprising: a ground engagement tool carried by a row unit of the agricultural implement, the row unit including an opener assembly having at least one opener disc, and a product conveying system, the ground engaging tool positioned forward of the product conveying system relative to a travel direction of the agricultural implement, the ground engagement tool configured to continuously engage soil during operation of the agricultural implement, such that the ground engagement tool include a ground engagement portion has a curved shape, a pointed shape or a flat shape to engages an initial opening in the soil formed by the at least one opener disc to control a shape and depth of the soil to form a seeding path in the soil for the product conveying system, wherein the ground engagement tool is electrically conductive and has an opening; an insulative material extending circumferentially around a periphery of the opening and longitudinally from a first end of the opening to a contact area, wherein a geometry of the contact area includes a conical shape; a conductive material filling at least a portion of the opening and extending to the contact area, such that the conductive material is electrically coupled to the ground engagement tool at the contact area; a sensor comprising a first conductor and a second conductor, wherein the first conductor is electrically coupled to the conductive material, and the second conductor is electrically coupled to the ground engagement tool; and a controller comprising a memory and a processor, wherein the controller is communicatively coupled to the sensor and configured to: receive a sensor signal from the sensor indicative of an electrical resistance between the first conductor and the second conductor, wherein the electrical resistance is at least partially based on a surface area of contact between the conductive material and the ground engagement tool at the contact area; determine the ground engagement tool has worn past a threshold amount in response to receiving the sensor signal indicative of the electrical resistance between the first conductor and the second conductor being above a threshold value; and output an output signal in response to determining the ground engagement tool has worn past the threshold amount.

2. The agricultural implement of claim 1, wherein the controller is configured to determine an amount of structural change in the ground engagement tool based on a magnitude of the electrical resistance.

3. The agricultural implement of claim 1, wherein the controller is configured to determine the ground engagement tool has worn past a second threshold amount in response to receiving the sensor signal indicative of no electrical connection between the first conductor and the second conductor.

4. The agricultural implement of claim 1, comprising an electrical connection configured to communicatively couple the sensor to the controller, wherein the electrical connection is routed along a rear side of the ground engagement tool relative to the direction of travel of the agricultural implement.

5. The agricultural implement of claim 4, wherein the opening is formed in the rear side of the ground engagement tool.

6. The agricultural implement of claim 1, wherein the output signal is indicative of instructions to present a notification on a display of the agricultural implement, wherein the notification is associated with a structural change of the agricultural implement, a suggested operation of the agricultural implement, or both.

7. The agricultural implement of claim 1, wherein the at least one opener disc includes a pair of opener discs and the ground engagement tool is positioned between the pair of opener discs of the agricultural implement.

8. An agricultural implement, comprising: a row unit including: a ground engagement tool; an opener assembly including at least one opener disc; a product conveying system, wherein the ground engagement tool is positioned forward of the product conveying system relative to a travel direction of the agricultural implement, the ground engagement tool configured to continuously engage soil during operation of the agricultural implement, such that the ground engagement tool include a ground engagement portion has a curved shape, a pointed shape or a flat shape to engages an initial opening in the soil formed by the at least one opener disc to control a shape and depth of the soil to form a seeding path in the soil for the product conveying system, The ground engagement tool comprising: a body which is electrically conductive; a first conductor disposed within an opening formed in the body; and a second conductor disposed within the opening, wherein the second conductor and the first conductor are electrically isolated from one another while a structural change in the ground engagement tool has not worn past a threshold amount; wherein the first conductor and the second conductor are positioned to be exposed to soil while the ground engagement tool is in a worn state to enable current to flow between the first conductor and the second conductor via the soil, wherein the opening terminates in the ground engagement portion of the ground engagement tool.

9. The agricultural implement of claim 8, comprising a controller communicatively coupled to the first conductor and to the second conductor.

10. The agricultural implement of claim 9, wherein the controller is configured to determine the ground engagement tool has not worn past the threshold amount in response to determining a magnitude of an electrical resistance associated with the current flow between the first conductor and the second conductor is greater than or equal to the threshold value, and the controller is configured to determine the ground engagement tool is in the worn state in response to determining the magnitude of the electrical resistance is less than the threshold value.

11. The agricultural implement of claim 9, wherein the controller is configured to determine the ground engagement tool has not worn past the threshold amount in response to receiving a sensor signal at a first frequency that is less than a threshold frequency, and the controller is configured to determine the ground engagement tool is in the worn state in response to receiving the sensor signal at a second frequency that is greater than the threshold frequency.

12. The agricultural implement of claim 8, wherein insulative material is disposed within the opening to electrically isolate the first conductor and the second conductor from one another.

13. An agricultural implement, comprising: a ground engagement tool carried by a row unit of the agricultural implement, the row unit including an opener assembly having at least one opener disc, and a product conveying system, the ground engaging tool positioned forward of the product conveying system relative to a travel direction of the agricultural implement, the ground engagement tool configured to continuously engage soil during operation of the agricultural implement, such that the ground engagement tool include a ground engagement portion has a curved shape, a pointed shape or a flat shape to engages an initial opening in the soil formed by the at least one opener disc to control a shape and depth of the soil to form a seeding path in the soil for the product conveying system, wherein the ground engagement tool has an opening; a sensor comprising a first conductor and a second conductor, wherein the first conductor is at least partially disposed within the opening, and the first conductor and the second conductor are spaced apart from one another; and a controller comprising a memory and a processor, wherein the controller is communicatively coupled to the sensor and configured to: receive a sensor signal from the sensor indicative of an electrical resistance between the first conductor and the second conductor; determine the ground engagement tool has worn past a threshold amount in response to receiving the sensor signal indicative of the electrical resistance between the first conductor and the second conductor being below a threshold value; and output an output signal in response to determining the ground engagement tool has worn past the threshold amount, wherein the controller output the output signal to a user interface.

14. The agricultural implement of claim 13, wherein the controller is configured to determine an amount of structural change in the ground engagement tool based on a magnitude of the electrical resistance.

15. The agricultural implement of claim 13, wherein the controller is configured to determine an amount of structural change in the ground engagement tool based on a frequency at which the sensor signal is received.

16. The agricultural implement of claim 13, wherein the opening is at least partially filled with an insulative material configured to electrically isolate the first conductor from the second conductor while the ground engagement tool has not worn past the threshold amount.

17. The agricultural implement of claim 16, wherein at least the first conductor is configured to be exposed to an ambient environment while the ground engagement tool has worn past the threshold amount, and in response to further operation of the agricultural implement, the first conductor is configured to electrically couple to the second conductor.

18. The agricultural implement of claim 13, wherein the output signal is indicative of instructions to increase a penetration depth of the ground engagement tool within the soil.

* * * * *